(12) United States Patent  (10) Patent No.: US 7,678,270 B2
Sisemore  (45) Date of Patent: Mar. 16, 2010

(54) DEVICE FOR FOCUSING A MAGNETIC FIELD TO TREAT FLUIDS IN CONDUITS

(76) Inventor: Stanley L. Sisemore, 267 Klenc Rd., Springdale, AR (US) 72762

(*) Notice: Subject to any disclaimer, the term of this patent is extended or adjusted under 35 U.S.C. 154(b) by 968 days.

(21) Appl. No.: 11/233,983

(22) Filed: Sep. 23, 2005

(65) Prior Publication Data

US 2007/0068862 A1  Mar. 29, 2007

(51) Int. Cl.
*C02F 1/48* (2006.01)
*F02M 33/00* (2006.01)
(52) U.S. Cl. ............... 210/222; 210/695; 123/538
(58) Field of Classification Search ............ 210/222, 210/223, 695; 123/538; 184/6.25
See application file for complete search history.

(56) References Cited

U.S. PATENT DOCUMENTS 5,766,461 A * 6/1998 Kampf ................ 210/222

\* cited by examiner

*Primary Examiner*—David A Reifsnyder
(74) *Attorney, Agent, or Firm*—Donald W. Meeker

(57) ABSTRACT

Three magnet casings are adjustably and removably attached to one another such that the device may snuggly fit about fluid conduits of differing diameters. An outer casing wall of ferrous content stainless steel confines the magnetic field. An inner magnet holder frame attached to the outer casing wall holds a magnet to the conduit and is fabricated of non-ferrous stainless steel to allow maximum trans mission of the magnetic field to the fluid in the non-ferrous section of the conduit around which the casings are attached together.

15 Claims, 3 Drawing Sheets

DEVICE FOR FOCUSING A MAGNETIC FIELD TO TREAT FLUIDS IN CONDUITS

BACKGROUND OF THE INVENTION

1. Field of the Invention

The present invention relates to applying magnetic fields to treat fluids and in particular to a new and improved device for magnetically treating liquids and gases which may removably and adjustably be attached to a tube having a fluid, such as fuel, running through it to produce a unique magnetic field focused in such a way so as to improve the physical properties of the liquid, such as improving the fuel for better combustion with fewer emissions and better mileage in vehicular fuels.

2. Description of the Prior Art

It is well known in the art of magnetism that applying a strong magnetic field to a substance changes the direction of the magnetic moments of individual atoms within the substance. This allows scientists to use nuclear magnetic resonance to determine the geometric structures of a variety of organic compounds, including proteins. This technology has also been developed to create magnetic resonance imaging, which has become a vital tool in medical diagnostics.

Over the past several years, magnetism has been applied to liquids to alter their physical nature. Precisely which method of applying a magnetic field to a liquid results in superior physical transformation of the molecules within that liquid has been a hotly debated issue. In some designs, a flexible tubing through which liquid flows is wrapped around a single magnet. Other designs expose a liquid first to a north or south pole and then downstream to an opposite pole. It is also known to use multiple magnets in order to create one or more magnetic fields. For example, the north pole of a magnet may be applied to one side of a conduit while a south pole is applied to the opposite side. This results in a magnetic field that is perpendicular to the rate of fluid flow through the conduit. It is also known to have a plurality of magnets through which fluid flows such that all of the magnets have the same pole facing the conduit. For example, all of the magnets may be aligned such that only their south poles face the fluid conduit. This design may also be reversed such that only the north poles face the fluid conduit. Examples of this design may be found in U.S. Reissue Pat. No. 35,689 and in U.S. Pat. No. 4,568,901.

It has been found that by applying such magnetic fields to a liquid has a number of benefits. Fuels, such as gasoline, diesel fuel and natural gas all burn more efficiently after exposure to a magnetic field. Potable water, alcoholic beverages and other consumable liquids have a superior flavor. Scale is also reduced in metal and other pipes. It is believed that these properties may be enhanced by modifying the geometry and positioning of the magnets used to influence the physical properties of the liquid.

Because of the benefits of exposing a fluid to a magnetic field, it is desirable to use such magnetic devices in a variety of situations. Because the increase in fuel burning efficiency caused by magnetic fields is temporary, such magnetic devices must be located within the car, truck, boat etc. Properties caused by exposing fuel to a magnetic field at a gas station-or a refinery would dissipate before the fuel was burned. Unfortunately, vehicles today generally have a substantial amount of electronic equipment, including computer chips. Strong magnetic fields have a deleterious affect on such devices. Therefore, it is necessary to place the magnetic devices on a fuel line close enough to the engine such that the effects of the magnetic field do not dissipate prior to incineration of the fuel. It is also necessary that the magnetic device be far enough from any electronic equipment to avoid damage.

It is therefore desirable to provide a device for applying a magnetic field to a fluid in a conduit which device has been geometrically optimized to maximize the beneficial effects of applying a magnetic field to the fluid by focusing the magnetic field.

It is also desirable to provide a device for magnetically treating a fluid that provides only a minimal risk to nearby electrical equipment by confining the magnetic field to the conduit.

SUMMARY OF THE INVENTION

An object of the present invention is to provide a combination of three ferrite ceramic magnets housed in a relatively compact frame made of a stainless steel outer housing with a ferrite content to confine the magnetic field to a liquid conduit to which the frame is attached and an inner magnet holder non-ferrous content clamped onto a fuel line near the source of fuel combustion and away from magnetically sensitive parts and the magnets evenly spaced around the fuel line all aligned toward the fuel line in the same magnetic polar direction to optimize the magnetic effect on the fuel line focusing the magnetic force while confining the magnetic field for effectively applying a magnetic field to a fluid to provide optimum fuel combustion and minimal effect on magnetically sensitive parts.

A relate object of the present invention is to provide a clamping mechanism which is easy to install at a desired location on a fuel line to provide the magnetic field as close as possible to the fuel combustion source and as far as possible from parts that might be affected by a magnetic field.

In brief, in the present invention, three magnetic casings are attached to a fluid conduit resulting in a geometrically optimized configuration of the magnets in order to maximize the physical benefits imbued to the fluid. The three magnets are preferably 120° apart from one another. All three of the magnets are oriented such that the same pole faces the conduit. This results in a focused magnetic field that is directed on the liquid in the conduit which may be fuel in a fuel line. Preferably, the three magnets are attached to one another by means of screws or similar devices connecting flanges that protrude from either side of the magnet casings.

Three magnet casings are adjustably and removably attached to one another such that the device may snuggly fit about fluid conduits of differing diameters. An outer casing wall of ferrous content stainless steel confines the magnetic field. An inner magnet holder frame attached to the outer casing wall holds a magnet to the conduit and is fabricated of non-ferrous stainless steel to allow maximum transmission of the magnetic field to the fluid in the non-ferrous section of the conduit around which the casings are attached together.

After several years of testing on thousands of applications using different types of materials, it is has been experimentally demonstrated that the magnetic material, size and shape play a very important role in making the product work. Allenco 5 Ferrite Ceramic Magnet material is by far the best magnet type in combination with an iron content stainless steel for the magnet casing outer walls preferably 400 ferrous content stainless steel to contain the magnetic flux within the casing out walls and the magnet holder frame is preferably 300 non ferrous stainless steel so as not to interfere with the flux pattern in any way. The magnetic material is preferably 4"×0.5"×0.75" in size. Change the size, shape, or weight of the magnetic material, and much of the desired effect is lost.

This three magnet configuration is superior to existing methods of applying magnetic fields to fluids. This is because of the method by which the magnetic field affects the fluids.

Those skilled in the art will appreciate that the better a fuel is mixed with oxygen, the more efficiently it burns. Molecules that are clustered have less total surface area with which to react with nearby oxygen molecules. This means that fuel having clustered molecules will not burn as efficiently as fuel having molecules that are evenly distributed. Not only does the fuel burn less efficiently, but more polluting molecules are subsequently emitted into the environment.

The exposure of a fluid, such as a fuel, to a magnetic field causes clustered molecules to separate. Those skilled in the art will appreciate that both hydrogen and nitrogen molecules have an atomic magnetic moment. Physicists generally refer to this as atomic spin. Nearby atoms generally have their nuclear magnetic moments aligned in opposite directions. Just as north poles of magnets repel one another and opposite poles attract one another, atomic spin causes atoms to be attracted to other atoms having opposite magnetic moments and being repelled by atoms having magnetic moments aligned in the same direction. When a fluid is exposed to a strong magnetic field, the result is what physicists refer to as spin-flip. The relatively strong magnetic field causes the magnetic moment of all of the molecules within a fluid to face the same direction. The result is that neighboring molecules are repelled from one another. Exposure to a strong magnetic field, and resultant spin-flip, causes sufficient repelling force to counteract the interactions between temporary dipoles. The molecules of the fuel become evenly dispersed. This improves efficiency of burning the fuel and reduces the amount of pollution emitted.

The present invention provides means for focusing a magnetic field used to treat a fluid such that more of the generated magnetic field is conserved as well as reducing the risks to nearby electronic equipment.

The magnet casings may have flanges that connect to one another by means of a nut and bolt. This allows for ready and convenient attachment of the present invention to a fuel line or other fluid conduit.

An advantage of the present invention is that it provides the optimum combination of magnets and frame to maximize fuel combustion.

An additional advantage of the present invention is that it is easy to install in any desired location.

One more advantage of the present invention is that it minimizes the effect of the magnetic field external to the fuel line.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
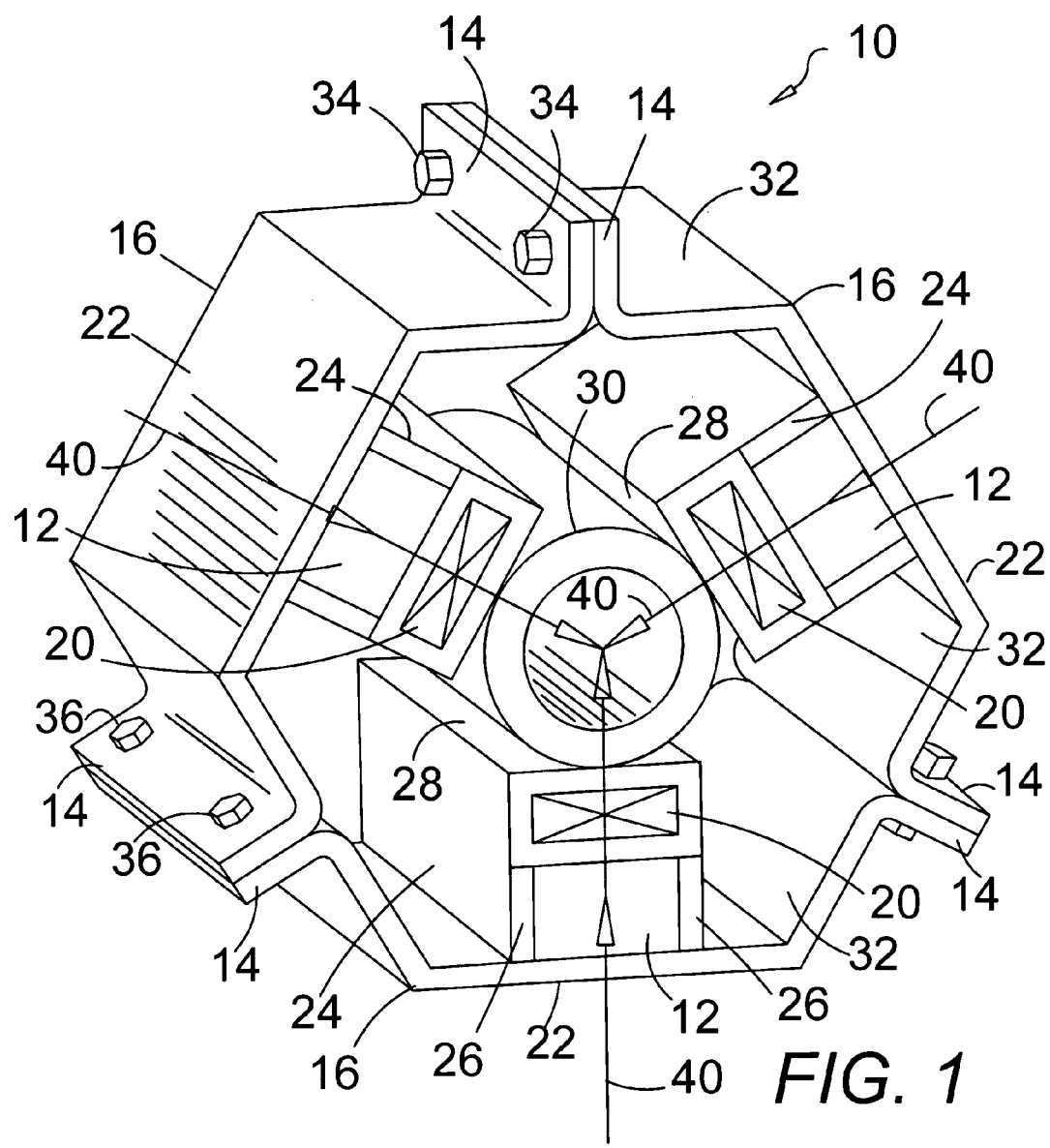
FIG. 1 is a diagrammatic perspective view of the present invention.

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

In the present invention, the geometry of the magnets used is optimized to create a device that maximizes the benefits of magnetizing a liquid. Although it is especially suitable for magnetizing fuels, such as propane, natural gas, gasoline, diesel etc., it may also be used to magnetize other liquids. Motor oil and other lubricants exhibit superior performance when routinely magnetized. Similarly, consumable liquids typically have enhanced flavor when the device of the present invention is utilized to apply a magnetic field to them. The present invention may also be utilized to reduce the amount of scaling in a fluid system. In addition, special shielding of the magnetic field is provided by the device in order to better focus the magnetic field. This results in a greater portion of the magnetic field generated by the magnets to be applied directly to the fluid and not the surrounding area. This makes the device especially suitable in devices and environments in which electronic equipment is located. Specifically, it is especially useful for use in automobiles, trucks, boats, etc.

In the preferred embodiment, the present invention consists of three magnets, each within its own casing. These casings are adjustably and removably attached to one another such that the device may snuggly fit about conduits of differing diameters.

In FIGS. 1-4, a magnetic field application device 10 for applying a shielded magnetic field to a liquid flowing within a conduit 30, the device comprising preferably three ferrite ceramic magnets 12 or more, each having a north pole and a south pole with a magnetic field emanating therefrom and three magnet casings 16, or more for more magnets, each housing a magnet 12. The ferrite ceramic magnets are preferably each an Allenco 5 Ferrite Ceramic Magnet to optimize the magnetic field in affecting the fluid in the conduit. The ferrite ceramic magnets preferably each measure 4"×0.5"×0.75" in size for an optimum magnetic field with a minimum size.

Each casing 16 comprises an outer casing wall 22 fabricated of a ferrous content stainless steel to confine the magnetic field inside the outer casing wall and preferably fabricated of 400 ferrous stainless steel to optimize the confinement of the magnetic field. The three magnet casings 16 are adjustably and removably attached to one another around a non-ferrous section of a fluid conduit 30. An inner magnet holder frame 24 are attached, preferably by spot welding, to the outer casing wall 22 to hold a magnet 12 in proximity to the conduit 30. The inner magnet holder frame 24 is fabricated of a non ferrous stainless steel to allow full transmission of the magnetic field 40 to the conduit 30 and preferably fabricated of 300 non ferrous stainless steel to optimize transmission of the magnetic field to the fluid in the conduit. To attach the magnet holder frame 24 to the casing 16, it may be welded, spot welded, braised, screwed, bolted, riveted or attached by other methods known in the art The three magnet casings 16 with the three magnet holder frames 24 secure the ferrite ceramic magnets 12 in an annular array with the magnets equally spaced at 120 degree angles from each adjacent magnet 12 around the conduit 30 with the magnetic poles of the three ferrite ceramic magnets all oriented identically with the same pole facing the conduit, either all north pole or all south pole.

Figure 3:
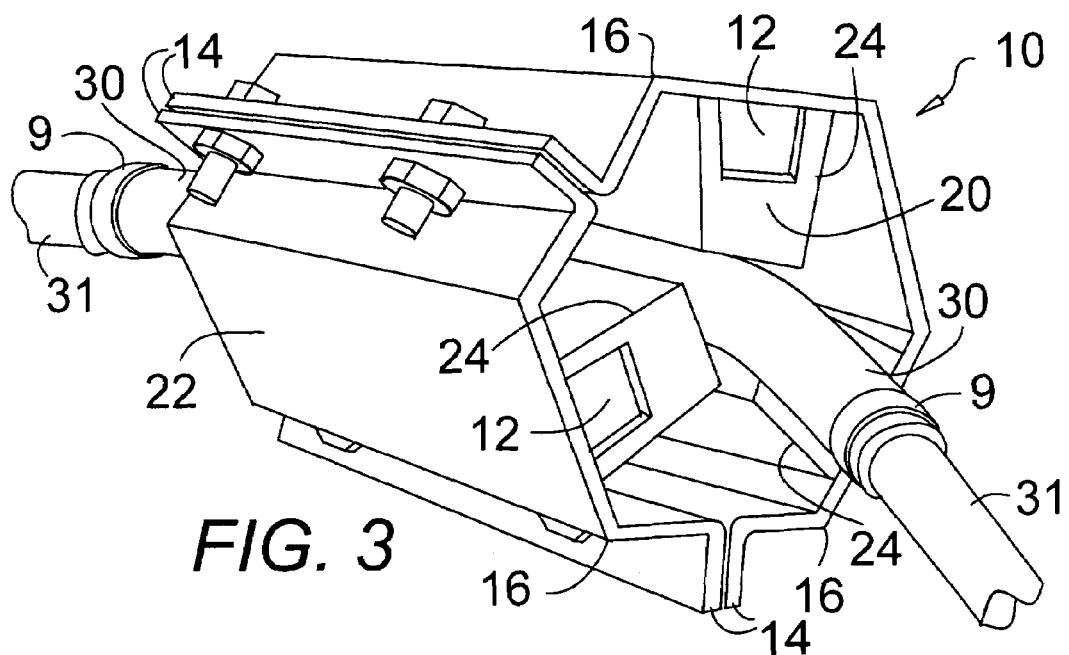
FIG. 3 is a diagrammatic front view of an alternative embodiment of the present invention.

In FIG. 3, since the conduit 30 at the location of the device 10 must be non ferrous to allow full transmission of the magnetic field 40, in the case of a ferrous content conduit 31, the device further comprises a section of non-ferrous conduit 30 installed by hose clamps 9 or other means in place of a section of ferrous content conduit 31 for installation of the device 10 on the section of non-ferrous conduit 30.

In FIG. 1, each casing 16 has a sidewall 32 and a flange 14 on two opposite sides of the casing outer wall 22. The casings 16 have been connected to one another by flange nuts 34 and flange bolts 36 that penetrate adjacent flanges and hold them to one another. Flange nuts 34 are preferably self-locking. Those skilled in the art will appreciate that nuts may be purchased any number of places having a Teflon® region that holds them in place regardless of how far down a bolt stem they are screwed. These are preferred in the present invention. However, those skilled in the art will appreciate that there are other methods of adjustably attaching two flanges.

The magnet holder frames 24 are comprised of sidewalls 26 and interior wall 28. The magnet holder frames 24 also have securing walls 20 that hold magnets 12 in place. Magnets 12 are each aligned so that the same pole is facing conduit 30. In this particular embodiment, magnets 12 have south poles facing conduit 30.

As can be seen in FIG. 1, the support walls 20 do not need to cover the entire end of magnets 12. The support walls 20 only need to extend far enough to ensure that the magnets are securely held in magnet compartments 24.

Figure 2:
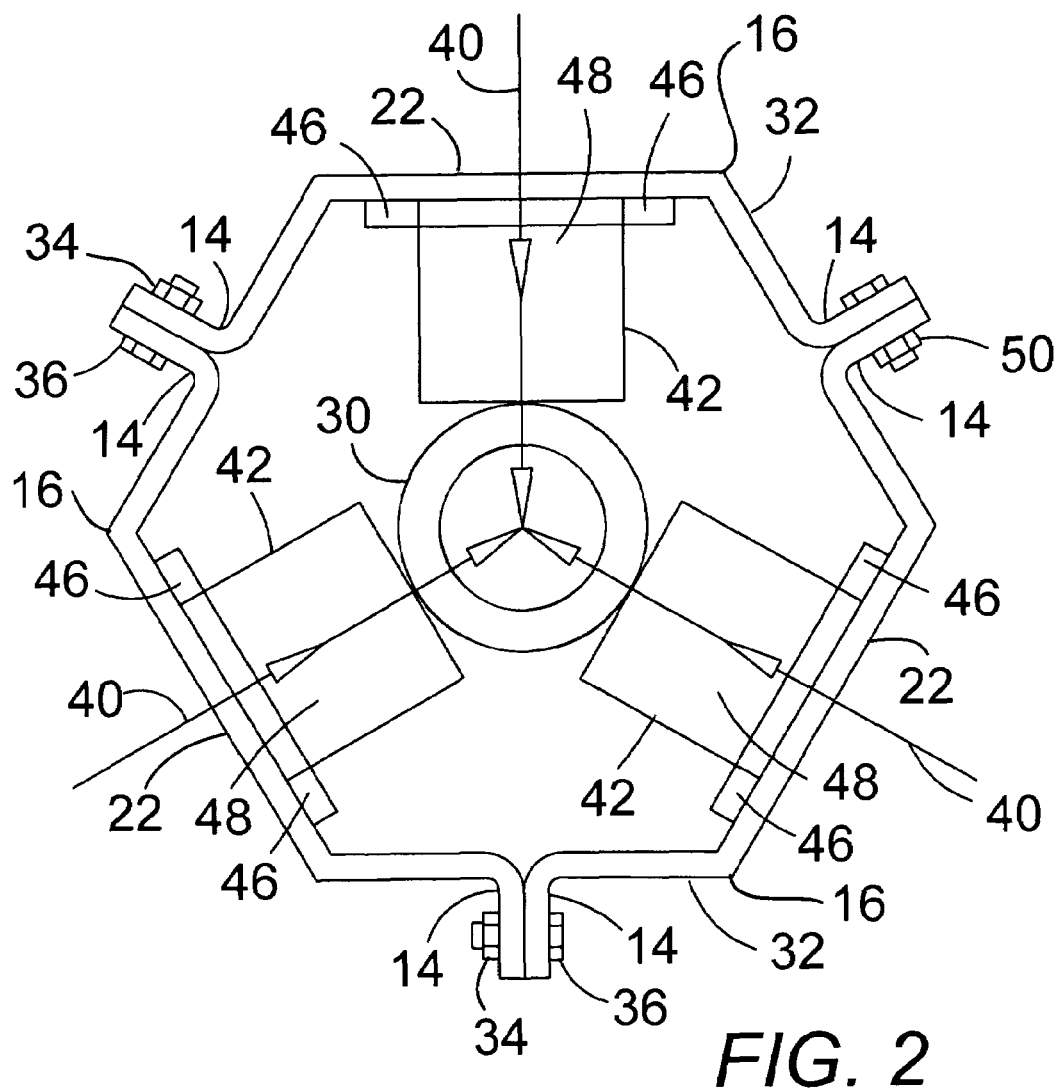
FIG. 2 is a diagrammatic front view of the present invention.

FIG. 2 shows an embodiment of the present invention from a diagrammatic front view. In this embodiment, the magnet holder frames are magnet compartments 42 attach to magnet casings 16 by welding wings 46 onto the outer casing walls 22. Wings 46 are a part of the magnet compartments 42.

The embodiment shown in FIG. 2 also has securing walls 48 that cover an entire side of the magnet (not shown). The embodiment in FIG. 2 illustrates one of many ways to attach a magnet compartment 42 to a magnet casing 16.

Fluid conduit 30 is exposed to magnetic field 40 by the magnets of the embodiment. The embodiment of FIG. 2 also shows attachment means, such as a bolt 36 and a nut 34 for removably, adjustably connecting flanges to one another. The connecting means may be any means known in the art to connect flanges 14 and adjust the distance between them.

Figure 4:
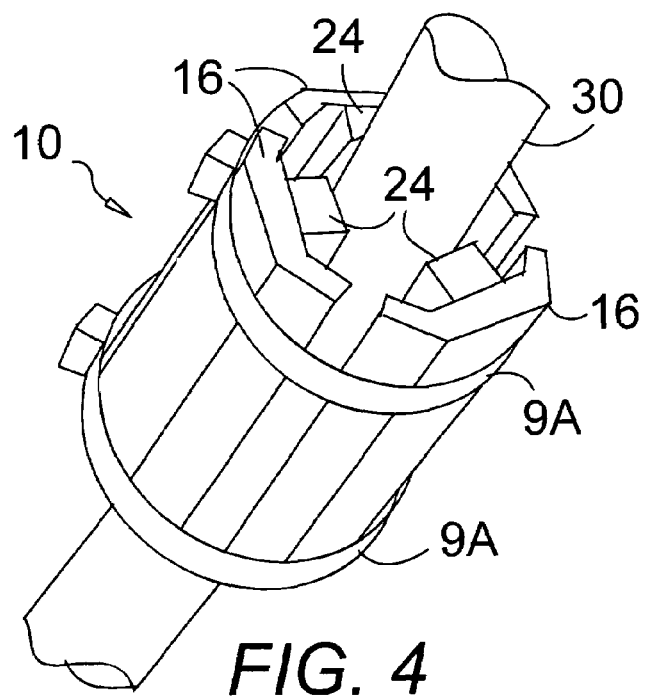
FIG. 4 is a diagrammatic front view of an alternative embodiment of the present invention.

In FIG. 4, an alternate means for adjustably attaching the magnet casings 16 together around a conduit 30 comprises encircling the three casings 16 by at least two large hose type clamps 9A or other clamping means to bind the casings 16 around the conduit 30.

After several years of testing on thousands of applications using different types of materials, it has been proven that the iron content 400 ferrous stainless outer casing walls 22 and 300 non ferrous stainless steel magnet holder frames 24 in combination with the Allenco 5 Ferrite Ceramic Magnet material is by far the best combination to optimize the effect of the magnetic field on the fluid in the conduit 30 by focusing the magnetic field and also confining the magnetic field within the device. The magnetic material, size and shape play a very important role in making the product work. Change the size, shape, or weight of the magnetic material, and much of the desired effect is lost. The right amount of each element plays an important role.

This three magnet configuration is superior to existing methods of applying magnetic fields to fluids. This is because of the method by which the magnetic field affects the fluids.

Hydrocarbon fluids such as fuels like gasoline and propane are hydrophobic. Generally, it has been thought that the cohesive properties of such molecules were relatively small. Their hydrophobicity was thought to, by its nature, prevent clustering of like molecules. However, this inner molecular model has been rethought in light of van der Walls forces and temporary dipoles. Those skilled in the art will appreciate that even in hydrophobic molecules, temporary dipoles are created by shifts in electron clouds that surround the molecules. This results in non-polar molecules exhibiting polar behavior. Those skilled in the art will appreciate that fluctuating electrons within one molecule will influence the behavior of electrons in the neighboring molecule. The results of this is nearby molecules having dipoles facing opposite directions. This results in the molecules clustering together.

Those skilled in the art will appreciate that the better a fuel is mixed with oxygen, the more efficiently it burns. Molecules that are clustered have less total surface area with which to react with nearby oxygen molecules. This means that fuel having clustered molecules will not burn as efficiently as fuel having molecules that are evenly distributed. Not only does the fuel burn less efficiently, but more polluting molecules are subsequently emitted into the environment.

The exposure of a fluid, such as a fuel, to a magnetic field causes clustered molecules to separate. Those skilled in the art will appreciate that both hydrogen and nitrogen molecules have an atomic magnetic moment. Physicists generally refer to this as atomic spin. Nearby atoms generally have their nuclear magnetic moments aligned in opposite directions. Just as north poles of magnets repel one another and opposite poles attract one another, atomic spin causes atoms to be attracted to other atoms having opposite magnetic moments and being repelled by atoms having magnetic moments aligned in the same direction. When a fluid is exposed to a strong magnetic field, the result is what physicists refer to as spin-flip. The relatively strong magnetic field causes the magnetic moment of all of the atoms within a fluid to face the same direction. The result is that neighboring molecules are repelled from one another. Exposure to a strong magnetic field, and resultant spin-flip, causes sufficient repelling force to counteract the interactions between temporary dipoles. The molecules of the fuel become evenly dispersed. This improves efficiency of burning the fuel and reduces the amount of pollution emitted.

Because of the present invention's unique combination and configuration, a single magnetic field is evenly distributed across the fluid conduit. Monopole systems generate opposing fields and do not cause molecules to repel each other as effectively. Because this system uses three magnets instead of two opposing magnets, a broader magnetic field is created within the conduit that evenly distributes the field across the fluid.

Whereas, the present invention has been described in relation to the drawings attached hereto, it should be understood that other and further modifications, apart from those shown or suggested herein, may be made within the spirit and scope of this invention.

In practice, for use of the magnetic field application device 10 of the present invention to a fuel line in a vehicle, to get started it is important that you know the current baseline and mileage and RPM's at warm idle of your vehicle before you install the present invention. This will give you the information you need to have a reliable measure of the unit's performance after installation.

For example, your vehicle's manufacturer may list what mileage your vehicle should obtain, but unless you measure this yourself, you can't be certain of your vehicles performance. Use at least two tanks of fuel while keeping very good records of the mileage on the odometer and the amount of fuel used. After two tanks, you should be able to determine the general miles per gallon your vehicle is achieving.

Check your vehicle's tachometer readings to determine your RPM's at warm idle and at highway speeds. To record the RPM's at warm idle; remember to turn off the vehicle's air conditioner for at least two minutes prior to noting the tachometer readings. When possible, test your vehicles emissions both before and after installing the present invention. Check with your local highway transportation authority to locate a certified emissions testing center near you. Try to get the NOx, Co, Co2, and the actual readings, not just pass or fail.

Your vehicle should be in good running order prior to installing the unit. The present invention will not compensate for existing electrical or mechanical defects. Make a note of the age and condition of your vehicle. Results will vary depending on how and where you drive your vehicle. For example, at what speeds and duration do you usually drive? Do you drive in a city with high traffic and frequent stops or on highways with longer hauls and steady speeds? Is your vehicle more than 5 years old? 10 years old? Have you performed suggested maintenance and upkeep on your vehicle? Will you be changing any of those driving and maintenance habits after installing the present invention?

You will need to change the oil and filter on your vehicle. It is recommended that you change the oil and filter between 1,000 to 1,500 miles after installation. (Change oil and oil filter again at 2,000 to 2,500 miles and at 3,000 to 3,500). Many users of the present invention note that the unit works rapidly to breakup carbon deposits in their vehicle's engine. This means the oil will pickup those carbon deposits and your oil will need to be changed at the above specified intervals. (There is a different requirement for larger equipment applications.)

If you're driving an older model vehicle, you will need to change the oil not only at 1,000 to 1,500 miles after installation but again at 2,000 to 2,500 miles then 3,000 to 3,500 to ensure your engine will benefit from clean oil as the present invention does its work. Eventually, the engine will be cleaned and you can keep your same oil to the point of viscosity failure. You would change oil at 28,000 miles now. So, as you measure the effectiveness of the present invention, keep an eye on the condition of your vehicle's motor oil to maximize results. If your oil does not have the emissions in it your oil doesn't get dirty. So use it up to the end of the viscosity of the oil you're using to save more money.

Make certain you know where the fuel supply line is on your vehicle (or the low-pressure suction side of the fuel pump in diesel applications). There are so many different varieties of automobiles and trucks with just as many different engine configurations. Fuel lines are not located in the same place on all vehicles. Make certain you have located the fuel supply line, not the fuel return line. The present invention works more efficiently when it is located in the correct place for the particular make and model of your vehicle.

Make certain the fuel line is nonferrous. That is, the magnetic bars in the present invention should not be attracted to the fuel line. A ferrous line will dissipate the unit's unique magnetic field before the fuel can be treated. While this is seldom a problem with passenger vehicles, it is an issue on over-the-road trucks.

If a line is ferrous, a short length of nonferrous custom line can be fabricated for a custom installation or the entire line can be replaced in some cases. The fuel lines may need to be replaced with a rubber or non-magnetic line. This situation is common on these engines and the cost is low for the line that is needed.

Acceptable fuel lines are rubber, nylon, plastic, stainless steel, copper, brass, aluminum and metal that it not magnetized. Always check your lines even if the don't look ferrous! Fuel lines that will need to be altered include: any line that is magnetic. (Note this by observing a magnetic attraction). A steel braided line, a line near a high heat area. If any of the unacceptable conditions exist for your vehicle, contact a certified installer to determine the best action to take. Or ask a mechanic that you trust to help you with your installation.

It's also important for you to know where the fuel filter is. The unit works best when installed on the fuel line between the fuel filter and the injector rack or aspirated carburetor.

You will need to disconnect the negative battery cable prior to installing the present invention, then turn headlights on, apply the brakes for fifteen seconds or longer. Turn off the headlights after installation and replace the negative battery cable on the cable. Also touch both terminals together to dissipate the capacitor in the ECU. Don't worry, there won't be a spark. This allows the computer memory of fuel-injected engines to reset or recalibrate and, therefore, more rapidly sense the effects of the present invention at work. The battery cables should remain disconnected during the installation of the present invention.

The present invention is made up of magnets and should not be placed near the ECU and some electronic devices. (Compasses, GPS screens etc.) 3 to 4 inches of clearance should be sufficient.

The present invention comprises three metal sections containing bar magnets, three small pads that will be used on the inside of the assembled unit (if it needs to fit around a fuel line with a smaller diameter). One large pad that will be adhered to the side of the unit that is nearest the vehicle frame to prevent rubbing and any noise from bumping, three screws and three locknuts, and two nylon straps that will be used to secure the unit to prevent it from moving or bouncing.

The present invention unit comes partially assembled in three identical pieces, stacked for easy shipping.

To install the present invention, locate a straight section (6 to 12 inches) of the fuel supply line between the fuel filter and the injector rack or aspirated carburetor. Make certain the line is nonferrous by using a telescopic pocket magnet and determine whether it is attracted to the line. If it's nonferrous, continue. If it does "stick", put the unit in another location on the fuel line that is not magnetic. If all of the line appears ferrous, a splice will be necessary to proceed. The fuel line will need to be replaced with a rubber or non-magnetic line. Always double clamp both ends of your splice on hard spliced lines. Do not install the unit in high-heat areas. Do not locate it directly on or next to the engine block or a turbo charger. Keep it at least 6 inches away from the manifold, catalytic converter or muffler of the vehicle. For best results allow at least 1 to 2 inches of "straight" fuel line before a bend in the line going to the fuel rack or aspirated carburetor.

On all vehicles that are computer aided, disconnect the negative battery cable prior to installing the present invention, then turn headlights on, apply the brakes for fifteen seconds or longer. Turn off the headlights after installation and replace the negative battery cable on the cable. This resets the ECU.

4. Attach two magnet sections with screws and locknuts (Leaving one side completely open). Tighten the nuts completely The unit should then look like a "v" Because the magnets are so strong, you may find it easier to insert the first screw while turning the magnets pieces perpendicular to each other. Then, after the first screw is slightly tightened you will be able to rotate the sections together to align the holes to insert the second screw and locknut.

Determine whether the smaller pads should be used on the unit. Do this by taking the two connected sections in the shape of a "v" and the remaining free section and wrap them around the spot you've selected on the fuel line as if they were all connected. Make certain the unit will fit snuggly around the line and won't slip. If the unit slides along the line, remove the backing from the smaller foam padding strips and Apply small pads to the face of each magnet as needed.

Then continue to assemble the unit, but remember to leave one seam open to allow mounting over the fuel line. Please tighten the screws securely. Note that a properly assembled unit is triangular and that all the magnets face inwards towards each other.

Wrap the magnetic field application device around the line and tightly secure it to the line with the remaining assembly screws and locknuts. Do not tighten to the point of cutting off the flow of fuel or pinching the line. When installed properly, all 3 magnets should be touching the fuel line and shall be evenly distributed around the fuel line.

Remove the backing from the rubber pad and adhere the large pad to the side of the magnetic field application device that's nearest the vehicle frame. Insert the cable ties through the elongated slots in the magnetic field application device and tighten until the unit is firmly attached to the vehicle. Its best if the unit does not bounce or move freely, but rather is tightly connected and strapped down securely to some portion of the vehicle.

Reconnect both battery cables. Start your vehicle and let the engine warm idle with the air conditioning off for a few minutes or go drive the vehicle for a mile or two. This allows the untreated fuel in front of the magnetic field application device to be burned and the treated fuel is now in place.

Measure the RPM's at warm idle as shown on your tachometer. If the magnetic field application device has been properly installed, you should note a change in the RPM's at warm idle within five minutes or so. Most often the RPM's will drop. In some cases, the RPM's drop at first, but then rise. In either case, the change is an indication that the magnetic field application device is working. In time, the RPM's should remain lower than before the unit's installation.

Change the oil and oil filter between 1,000-1,500 miles after installation. (Change oil and oil filter again at 2,000 to 2,500 miles and at 3,000 to 3,500). There is a different requirement for 18-wheelers. Because the magnetic field application device is causing the engine to clean carbon deposits, the oil will become dirtier faster than normal. Within two or three oil changes threshold be noticeable changes in the oil (it will stay cleaner) the performance of the engine should be immediate. If the magnetic field application device is installed on a new low mileage vehicle, it's likely the vehicle is operating at its peak efficiency because it is new, So, there may be limited results at first. But over time, experts observe that the magnetic field application device will protect your vehicle's engine from buildup and other wear and tear issues helping to extend its life and the quality of its performance.

In older vehicles test results have shown up to 50% reduction in exhaust emissions (in older vehicles test results have shown 50% or greater reduction in exhaust emissions) and 5% to 15% and greater improvement in gas mileage while increasing horsepower.

Your vehicle may require a brief "breaking in" period before measurable gains in fuel economy or engine performance will occur. The length of this break-in depends upon the mileage age, and condition of the engine. Frequently, a temporary degradation fuel mileage and increase in emissions will occur until built-up carbon is expelled from the engine. If you keep a record of your vehicle's miles per gallon you'll be able to see a difference.

After having installed thousands of magnetic field application device units on a variety of different vehicles, trucks buses, boats and train being used for a variety of different driving needs, it seems that there is no "typical" installation. Optimum location for the magnetic field application device can vary widely between manufacturers and even among like engine models.

The magnetic field application device of the present invention has proven in tests to be equally effective in other fuel line applications including fuels such as natural gas, gasoline, diesel etc. It has also been effective in magnetizing other liquids. Motor oil and other lubricants exhibit superior performance when routinely magnetized. Similarly, consumable liquids typically have enhanced flavor when the device of the present invention is utilized to apply a magnetic field to them. The present invention may also be utilized to reduce the amount of scaling in a fluid system.

With the magnetic field application device, large truck horsepower has been shown to increase as well as reducing fuel consumption by up to 20%. Furnaces have been shown to burn hotter and use 10% less fuel. In large water heating systems fueled by natural gas, fuel consumption was reduced by 28% using the magnetic field application device of the present invention.

It is understood that the preceding description is given merely by way of illustration and not in limitation of the invention and that various modifications may be made thereto without departing from the spirit of the invention as claimed.

What is claimed is:

1. A magnetic field application device for applying a shielded magnetic field to a fluid flowing within a conduit, the device comprising:

at least three ferrite ceramic magnets, each having a north pole and a south pole with a magnetic field emanating therefrom;

at least three magnet casings adjustably attached around any of a variety of fluid conduits of various diameters for positioning the at least three ferrite ceramic magnets around the fluid conduit to create a magnetic field imparted to a fluid within the fluid conduit, each of the at least three magnet casings comprising an outer casing wall of ferrite content stainless steel to confine the magnetic field inside its outer casing wall in order to shield any external magnetically sensitive devices from the magnetic field and to focus the magnetic field on the fluid within the fluid conduit, the at least three magnet casings being adjustably and removably attached to one another around a non-ferrous section of the fluid conduit, each of the at least three magnet casings comprising an inner magnet holder frame attached to an inner side of its outer casing wall to hold one of the at least three ferrite ceramic magnets in proximity to the fluid conduit, each inner magnet holder frame being fabricated of non-ferrous stainless steel to allow maximum transmission of the magnetic field to the fluid in the fluid conduit, the inner magnet holder frames securing the at least three ferrite ceramic magnets in an annular array with the at least three ferrite ceramic magnets being equally spaced around the fluid conduit with the magnetic poles of the at least three ferrite ceramic magnets oriented identically with the same pole facing the fluid in the fluid conduit in order to optimize the magnetic effect on the fluid and to maximize the physical benefits imbued to the fluid.

2. The device of claim 1 wherein the at least three ferrite ceramic magnets are each an Allenco 5 Ferrite Ceramic Magnet to optimize the magnetic field in affecting the fluid in the conduit.

3. The device of claim 2 wherein the at least three ferrite ceramic magnets each measure 4"×0.5"×0.75" in size.

4. The device of claim 1 wherein the outer casing walls are each fabricated of 400 ferrous stainless steel to optimize retention of the magnetic field within the outer casing walls.

5. The device of claim 1 wherein the magnet holder frames are each fabricated of 300 non ferrous stainless steel to optimize transmission of the magnetic field to the fluid in the conduit.

6. The device of claim 1 comprising three ferrite ceramic magnets housed in three magnet casings interconnected around the conduit with the three ferrite ceramic magnets angled 120° from one another.

7. The device of claim 1 wherein each of the at least three magnet casings further comprises attachment flanges and the at least three magnet casings are connected to one another by a nut and bolt mechanism through the flanges.

8. The device of claim 7 wherein the bolt is a self-locking bolt.

9. The device of claim 1 wherein the inner magnet holder frame of each of the at least three magnet casings is attached to the inner side of the outer casing wall by means of spot welding.

10. A device for applying a shielded magnetic field to a fluid flowing within a conduit, the device comprising:
three ferrite ceramic magnets, each having a north pole and a south pole with a magnetic field emanating therefrom;
three magnet casings adjustably attached around any of a variety of fluid conduits of various diameters for positioning the three ferrite ceramic magnets around the conduit to create a magnetic field imparted to a fluid within the fluid conduit, each of the three magnet casings comprising an outer casing wall fabricated of 400 ferrous stainless steel to confine the magnetic field inside its outer casing wall in order to shield any external magnetically sensitive devices from the magnetic field and to focus the magnetic field on the fluid conduit, the three magnet casings being adjustably and removably attached to one another around a non-ferrous section of a fluid conduit, each of the three magnet casings comprising an inner magnet holder frame attached to an inner side of its outer casing wall to hold one of the three ferrite ceramic magnets in proximity to the fluid conduit, each inner magnet holder frame of being fabricated of 300 non ferrous stainless steel to allow maximum transmission of the magnetic field to the fluid in the fluid conduit, the inner magnet holder frames securing the ferrite ceramic magnets in an annular array with the three magnets spaced at 120 degree angles from each adjacent ferrite ceramic magnet around the fluid conduit with the magnetic poles of the three ferrite ceramic magnets oriented identically with the same pole facing the fluid in the fluid conduit in order to optimize the magnetic effect on the fluid and to maximize the physical benefits imbued to the fluid.

11. The device of claim 10 wherein the at least three ferrite ceramic magnets are each an Allenco 5 Ferrite Ceramic Magnet to optimize the magnetic field in affecting the fluid in the conduit.

12. The device of claim 11 wherein the at least three ferrite ceramic magnets each measure 4"×0.5"×0.75" in size.

13. The device of claim 10 wherein each of the three magnet casings further comprises attachment flanges and the three magnet casings are connected to one another by a nut and bolt mechanism through the flanges.

14. The device of claim 13 wherein the bolt is a self-locking bolt.

15. The device of claim 10 wherein the inner magnet holder frame of each of the three magnet casings is attached to the inner side of the outer casing wall by means of spot welding.

* * * * *